(12) United States Patent
Perinkulam et al.

(10) Patent No.: US 9,118,919 B2
(45) Date of Patent: Aug. 25, 2015

(54) METHODS AND SYSTEMS FOR COMPUTING THE QUALITY OF AN MPEG-2 VIDEO STREAM

(75) Inventors: Suryanarayan Perinkulam, Clinton, NJ (US); Mark Anthony Smith, Jersey City, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1800 days.

(21) Appl. No.: 11/647,366

(22) Filed: Dec. 29, 2006

(65) Prior Publication Data

US 2008/0159410 A1 Jul. 3, 2008

(51) Int. Cl.
*H04N 19/00* (2014.01)
*H04N 19/159* (2014.01)
*H04N 19/89* (2014.01)

(52) U.S. Cl.
CPC .......... *H04N 19/159* (2014.11); *H04N 19/89* (2014.11)

(58) Field of Classification Search
CPC .................................................... H04N 19/166
USPC ..................................................... 375/240.27
See application file for complete search history.

(56) References Cited

U.S. PATENT DOCUMENTS

2008/0089414 A1* 4/2008 Wang et al. .............. 375/240.13

* cited by examiner

*Primary Examiner* — Sath V Perungavoor
*Assistant Examiner* — Jeffery Williams
(74) *Attorney, Agent, or Firm* — Capitol Patent & Trademark Law Firm, PLLC

(57) ABSTRACT

Novel "loss rate" metrics are presented that can be used to indicate the quality of a video stream. These metrics may be determined using a simplified method or by a more sophisticated method, the latter method applying different "weights" (i.e., adjustments) to error computations based on the type of frame involved (i.e., I, P, B). Both methods may produce a video quality score within a given range (e.g., in the range of 0 to 1) where one end of the range indicates a video stream of high quality (i.e., no frames are affected), and the other end indicates a video stream of low quality (i.e., all frames are affected).

6 Claims, 2 Drawing Sheets

*Metrics Needed for Method II.*

| Metric | Notation | Description |
|---|---|---|
| Lost Macro-blocks by Frame Type | $L_m^x$ | Estimated Number of Macro-blocks lost Due to Packet Loss for Frame of Type $x \in \{i,p,b\}$. |
| Total Macro-blocks by Frame Type | $T_m^x$ | Estimated Total Macro-blocks for Frame of Type $x \in \{i,b,p\}$. Can be Estimated as $M \cdot d^x \cdot F \cdot t$. |

*We Will Use the Example Frame Sequence IPPBPBIPPBI... for the Following Metrics.*

| | | |
|---|---|---|
| Average Number of P Frames Between Two I Frames | $p$ | 2.5 In the Above Example. |
| Average Number of P Frames Between a B Frame | $p^b$ | 2.333 In the Above Example. |
| Average Distance Between Two I Frames | $D^i$ | 5 In the Above Example. We Include the First I Frame in the Distance. |
| Average Distance of a P Frame From the Next I Frame | $\overline{D^p}$ | 3.2 In the Above Example. We Include the P Frame in the Distance. |
| Average Distance of n-th P Frame From the Next I Frame | $D_n^p$ | $D_1^p = 4$, $D_2^p = 3$, and $D_3^p = 2$ in the Above Example. We Include the P Frame in the Distance. |

*We Will NOT Need $\overline{D^p}$ if we Decide to Collect $D_n^p$.*

FIG. 1

*Metrics Needed for Method 1.*

| Metric | Notation | Description |
|---|---|---|
| Avg. Size of Frame Type $x$ | $FS^z$ | Average Bytes Used to Encode a Frame of Type $x \in \{i,p,b\}$ |
| Loss Distribution | $\mathcal{L}_p^z$ | Estimated Number of Packets Lost for the Frame Type $x \in \{i,p,b\}$ |
| I/P/B Distribution | $d^z$ | Distribution of Frame Type $x \in \{i,p,b\}$ |
| Frame Header Loss | $L_h$ | Number of Packets with Frame Headers that are Lost |
| Total Macro-blocks | $T_m$ | Total Number of Macro-blocks in the Sample Interval. This Can be estimated as $M \cdot F \cdot t$. |

FIG. 2

Metrics Needed for Method II.

| Metric | Notation | Description |
|---|---|---|
| Lost Macro-blocks by Frame Type | $L_m^x$ | Estimated Number of Macro-blocks lost Due to Packet Loss for Frame of Type $x \in \{i,p,b\}$. |
| Total Macro-blocks by Frame Type | $T_m^x$ | Estimated Total Macro-blocks for Frame of Type $x \in \{i,b,p\}$. Can be Estimated as $M \cdot d^x \cdot F \cdot t$. |

*We Will Use the Example Frame Sequence IPPBPBIPPBI... for the Following Metrics.*

| | | |
|---|---|---|
| Average Number of P Frames Between Two I Frames | $p$ | 2.5 In the Above Example. |
| Average Number of P Frames Between a B Frame | $p^b$ | 2.333 In the Above Example. |
| Average Distance Between Two I Frames | $D^i$ | 5 In the Above Example. We Include the First I Frame in the Distance. |
| Average Distance of a P Frame From the Next I Frame | $\overline{D^p}$ | 3.2 In the Above Example. We Include the P Frame in the Distance. |
| Average Distance of n-th P Frame From the Next I Frame | $D_n^p$ | $D_1^p = 4$, $D_2^p = 3$, and $D_3^p = 2$ in the Above Example. We Include the P Frame in the Distance. |

*We Will NOT Need $\overline{D^p}$ if we Decide to Collect $D_n^p$.*

METHODS AND SYSTEMS FOR COMPUTING THE QUALITY OF AN MPEG-2 VIDEO STREAM

BACKGROUND OF THE INVENTION

Though every MPEG-2 program stream typically includes many types of frames (e.g., I, P, and B) the frequency of occurrence of each frame type (and the number of bits needed to encode each frame type) within a given program stream may vary. Further, though each frame type is related to video quality, some frame types have more effect on the quality of a video stream than others. For example, the corruption of an I frame will have a greater effect on the quality of a video stream than the corruption of a P or B frame because I frames act as reference frames for the other frame types.

In the current state of the art, there are basically two types of methods to compute the quality of a transported video stream. The first method is based on techniques recommended by the Video Quality Experts Group of the ITU. This method involves using a "tool" (e.g., software) to produce a video quality score. The tool implements the ANSI standard for Video Quality Model (TI.801.032003). This type of methodology, however, does not work with live TV broadcasts. It also tends to be expensive.

The second method is to just look at packet loss information. The simplest way is to focus on packet loss rates. That is, a certain packet loss rate, for example $10^{-6}$, may be set as the tolerable packet loss rate. Thus, when the loss rate is less than this amount the video quality is deemed good, and when the loss rate is greater that this amount the loss rate is deemed poor. This second method, however, is too crude to capture the nuances of MPEG-2 transport steams. Yet other methods attempt to do deeper packet inspections and compute more significant details about packets that are lost. Unfortunately, these methods are typically too computationally expensive to do on the fly for large amounts of programs.

Accordingly, it is desirable to provide methods (and related devices) that combine the simplicity of the first method with the more computationally deep packet inspections of the other methods, but at a cost that is more affordable.

SUMMARY OF THE INVENTION

In accordance with the preset invention, the inventors discovered novel "loss rate" metrics that can be used to indicate the quality of a video stream. The metrics are implemented using methods and devices that represent a trade-off between methods that just look at packet loss rates, and the more computationally deep packet inspection methods. The metrics discovered by the inventors are more suitable for IPTV deployments than existing methods.

In more detail, the metrics are specified for a sample time or measuring interval that can be set as a parameter. For example, if the sample time is 30 seconds, then a video stream is measured in 30 second intervals, and a score is given for each interval. The metrics are determined by looking at how losses are distributed across different frame types. The data used to compute such loss metrics is gathered by probing/inspecting each packet that is used to transport the video stream a cross the delivery network. In one embodiment of the invention (simplified method) computations are based on estimating the number of lost macro-blocks for each frame type. In another embodiment (a more sophisticated method), a second method builds on the first method by applying different "weights" (i.e., adjustments) to error computations based on the type of frame involved.

More particularly, for a sample interval the first method involves the steps of: (a) determining the number of lost macro-blocks for each video frame type (I, P, B), $L^i_m, L^p_m, L^b_m$; (b) determining the total number of transmitted macro-blocks in the video stream $T_m$; and (c) computing a total loss rate from the determined number of lost macro-blocks and total macro-blocks.

The second method, for a sample interval, involves the steps of: (1) determining a weighted loss rate for an I frame using a weighted value that is based on an average frame distance between the I frame and a next I frame of a video stream; (2) determining a weighted loss rate for each P frame using a weighted value, where the weighted value for each P frame is based on an average frame distance between the P frame and the next I frame of the video stream; (3) determining a weighted loss rate for each B frame using a weighted value, where the weighted value is associated with a number of P frames before the B frame; and (4) summing the determined weighted loss rates of the I, P and B frames to arrive at a total, weighted loss rate.

In accordance with further embodiments of the invention, both methods may produce a video quality score within a given range (e.g., in the range of 0 to 1) where one end of the range indicates a video stream of high quality (i.e., no frames are affected), and the other end indicates a video stream of low quality (i.e., all frames are affected).

BRIEF DESCRIPTION OF THE DRAWINGS

FIG. 1 depicts a list of parameters, and their descriptions, that may be taken into consideration and measured to compute a total loss rate for a video stream according to one embodiment of the present invention.

FIG. 2 depicts a list of parameters, and their descriptions, that may be taken into consideration and measured to compute a total loss rate for a video stream according to another embodiment of the present invention.

DETAILED DESCRIPTION OF THE INVENTION, WITH EXAMPLES

Before presenting the details of the present invention, we first present some additional background information. Throughout the discussion above and below reference will be made to so-called macro-blocks. As known by those skilled in the art, a macro-block is an atomic entity within a MPEG encoded video frame. Macro-blocks are atomic in that errors in a macro-block in a frame are contained within that macro-block. Typically each frame of a video stream contains many such macro-blocks. As the name implies a macro-block has the dimensions of a block, i.e., 16×16 pixels. Upon transmission, each frame, and therefore every macro-block within a frame, is encoded. Multiple encoded frames are then combined to form a packet which is transmitted. Eventually the transmitted, encoded packet must be decoded in a complimentary receiver. Ideally, every frame that is transmitted will be accurately decoded and received. However, in reality, some frames and their corresponding macro-blocks are lost.

If the average encoding size of a frame is represented as $FS^x$ bytes (where $X \in \{i, p, b\}$ represents a frame of type I, P or B respectively), then the number of lost macro-blocks for a given frame type can be estimated as:

$$L_p^x = \frac{L_p^x \cdot M \cdot s}{FS^x} \quad (1)$$

From this, the estimated number of lost packets for the different frame types can be represented as $L_p^x, x \in \{i,p,b\}$.

When the header of a given encoded and transmitted frame is lost, it can be assumed that a decoder/receiver attempting to recreate the original video frame will be unable to use subsequent parts of that particular frame as well. For the sake of simplifying the present discussion, the inventors made the further assumption that the loss of a frame header leads to the complete loss of the entire frame. This is because the frame header will typically contain information on how to decode the frame. Thus, if the header is lost the decoder will not know how to decode that frame. Accordingly, for the purposes of computing an error rate, subsequent received packets that contain portions of the frame type for which the header is lost need to be counted as lost (i.e., lost macro-block) for that frame type because they cannot be used for the purpose of decoding.

In accordance with one embodiment of the present invention, to determine how the loss of frame headers impacts macro-blocks of a particular frame type, the inventors made the further simplifying assumption that losses of frame headers are uniformly distributed across frame types. Upon making this simplifying assumption the inventors realized that the fraction of headers lost for a given frame type, represented as $d^x L_p^x, x \in \{i,p,b\}$, may be seen as being proportional to the distribution of that frame type in a given video bit stream. Further, the inventors realized that this leads to a revision of Equation (1). More specifically, the value $L_p^x$ in Equation (1) needs to also include the value $(d^x \cdot L_h \cdot M)\lambda_m$, where $L_h$ is the estimated number of frames whose header was lost due to packet loss at the network. So, Equation (1) becomes, $$L_p^x = \frac{L_p^x \cdot M \cdot s}{FS^x} + (d^x \cdot L_h \cdot M) \quad (2)$$

where the first value (to the left of the addition sign) represents the number of macro-blocks lost per frame type and the second value represents the number of frames lost per frame type. In Equation (2), $FS^x$ is the average number of bytes used to encode a given frame type (see FIG. 1 for an explanation of M and s).

In accordance with the present invention, from Equation (2) the inventors discovered that a total loss rate, $\lambda_m$, may be represented as a sum of the loss ratings for each frame type divided by the total number of macro-blocks transmitted, or:

$$\lambda_m = \frac{\sum x \in \{i, p, b\} L_m^x}{T_m} \quad (3)$$

where $T_m$ is an estimate of the total number of macro-blocks (see FIG. 1).

It should be noted that the values of $L_p^x$ and $L_h$ must be accurately measured (i.e., not over-estimated). For example, for any frame whose header has been lost (included in $L_h$) subsequent packets that are lost for the same frame should not be included in $L_p^x$.

As set forth above, the total loss rate given by Equation (3) involves making measurements of the number of macro-blocks sent and lost for each frame type. In another embodiment of the present invention, these measurements may be "weighted" (i.e., adjusted) to compute an alternative set of video quality metrics (loss rates) as explained below.

In more detail, consider an exemplary MPEG video stream that consists of a set of frames IPPBPBI . . . (in some encoding order). In accordance with the present invention, the inventors assign a different (in theory, it can be the same . . . ) weighted value to each type of frame which is based on how many subsequent frames and error in the given frame will affect. That is, how far the error will propagate.

Taking an I frame first let $D^i$ be the average frame distance between two I frames. In the exemplary video stream $D^i$ is 6 (including the first I frame). For sake of simplicity and illustration, the inventors made the assumption that a lost macro-block that is part of an I frame will have errors associated with it until the next I frame occurs. If this is not the case $D^i$ can be set according to how far the errors propagate. Thus, it may be said that a single lost macro-block may result in $D^i$ macro-block errors (6 in the above exemplary video stream). It follows that the weighted loss rate (i.e., errors) for an I frame with $L_m^i$ lost macro-blocks may be represented as $D^i \cdot L_m^i$.

We now turn our attention to P frames. Similar to our discussion of I frames, the average number of P frames between two I frames may be represented as P (e.g., P=3 in the exemplary video stream above) and it may be assumed that macro-block errors caused by lost macro-blocks in a P frame may be carried until the next I frame in the MPEG video stream. As the inventors discovered, however, estimating a loss rate (i.e., number of errors or errored blocks resulting from a lost packet/bit) for a P frame is more involved than the estimation for an I frame.

Consider the first P frame in the exemplary video stream above. In accordance with the present invention, a lost macro-block results in an error only if it is different from any previous errored blocks (in this case from lost I frame blocks). This avoids counting the same error twice. Said another way, if a macro-block is affected due to the loss of an I-frame then it matters little that the same macro-block(s) are affected due to a P frame, macro-block loss. When an error is different it will linger for the distance to the next I frame annotated as $D_1^P$. In accordance with an embodiment of the invention, the weighted loss rate for the first P frame in the exemplary video stream above may be estimated as $D_1^P \cdot 1 - L_m^i / T_m^i$, where the term $1 - L_m^i / T_m^i$ signifies the probability of an error occurring that is not the same as an error propagated by an I frame (in the example above, the I frame at the start of the video stream). Further, the weighted loss rate for second P frame in the exemplary video stream above may be estimated as $D_2^P \cdot f$ $1 - L_m^i / T_m^i \cdot 1 - L_m^P / T_m^P$, where $1 - L_m^P / T_m^P$ is an indication of the probability that an error in the second P frame is different from an error propagated from the first P frame. Based on the above, the average, weighted loss rate (number of errors) of a P frame may be represented as:

$$1 - L_m^i / T_m^i \cdot \frac{\sum_{n=1}^{P} D_n^p \cdot \left(1 - \frac{L_m^p}{T_m^p}\right)^{n-1}}{P} \quad (4)$$

where, $D_n^P$ represents the average distance of the n-th P frame from the next I frame. It should be noted that $D_n^P$ may be measured as a running average of the n-th P frame in each group of pictures (GOP) (where a GOP in an MPEG2 stream is a group of I, B, P frames that have an header for the group, and each individual frame also has a header).

Using further mathematical reductions, the inventors discovered that the average loss rate in a P frame may be approximated as:

$$1 - L_m^i/T_m^i \cdot \overline{D^p} \cdot \frac{\sum_{n=1}^{P} D_n^p \cdot \left(1 - \frac{L_m^p}{T_m^p}\right)^{n-1}}{P} \quad (5)$$

where $\overline{D^p}$ represents the average distance of a P frame from the next I frame.

For the sake of completeness, the computational error in the approximation given by Equation (5) may be represented by $$\sum_{1 \leq k \langle n \leq P} (D_n^p - D_k^p) \cdot \left(1 - \frac{L_m^p}{T_m^p}\right)^{k-1} \cdot \left(\left(1 - \frac{L_m^p}{T_m^p}\right)^{n-k} - 1\right).$$

Similarly, the estimated, weighted average loss rate related to macro-block losses for a B frame may be represented by:

$$\left(1 - \frac{L_m^i}{T_m^i}\right) \cdot \left(1 - \frac{L_m^i}{T_m^i}\right)^{Pb} \cdot L_m^b \quad (6)$$

where $P^b$ represents the average number of P frames before a B frame (in the exemplary video stream above $P^b$ is 1.5).

In accordance with yet another embodiment of the invention, from equations (4) through (6), a total weighted loss rate, $\lambda_m$, may be represented as:

$$\lambda_m = \frac{1}{T_m} \cdot \left[ D^i \cdot L_m^i + \left(1 - \frac{L_m^i}{T_m^i}\right) \cdot \overline{D^p} \cdot \frac{\sum_{n=1}^{P} D_n^p \cdot \left(1 - \frac{L_m^p}{T_m^p}\right)^{n-1}}{P} \cdot L_m^p + \right.$$

$$\left. \left(1 - \frac{L_m^i}{T_m^i}\right) \cdot \left(1 - \frac{L_m^i}{T_m^i}\right)^{Pb} \cdot L_m^b \right] \quad (7)$$

FIG. 2 lists a description of the parameters that are included in Equation (7) which may be measured to compute the total weighted loss rate, $\lambda_m$.

In accordance with further embodiments of the invention, the loss rates computed in accordance with Equations (3) through (7) may be converted into a video quality score (e.g., from 0 to 1), where one end of the range indicates a video stream of high quality (i.e., no frames are affected), and the other end indicates a video stream of low quality (i.e., all frames are affected).

It should be understood that computations of loss rates and weighted loss rates may be carried out in an exemplary receiver. This receiver may take the form of a computer, network management device, or the like that is capable of capturing packet transmissions from a network. In any case, any such device may comprise the hardware, software and firmware to complete the computations, functions and features of the methods embodied in Equations (1) through (7).

The discussion above has set forth some examples of methods for computing the quality of a video stream, such as an MPEG-2 video stream. It should be understood that variations of the examples given above may be made. Such variations may fall within the scope of the present invention, a scope that is defined by the claims that follow.

We claim:

1. A method for determining a total weighted loss rate of an MPEG-2 video stream comprising:
   operating a device capable of capturing network packet transmissions to determine a weighted loss rate for an I frame using a weighted value that is based on an average frame distance between the I frame and a next I frame of a video stream in the time interval;
   operating the device to determine a weighted loss rate for each P frame using a weighted value, where the weighted value for each P frame is based on an average frame distance between the P frame and the next I frame of the video stream;
   operating the device to determine a weighted loss rate for each B frame using a weighted value, where the weighted value is associated with a number of P frames before the B frame; and
   operating the device to sum the determined weighted loss rates of the I, P and B frames to arrive at a total, weighted loss rate.

2. The method as in claim 1 wherein the total weighted loss rate ($\lambda_m$) is given by $$\lambda_m = \frac{1}{T_m} \cdot \left[ D^i \cdot L_m^i + \left(1 - \frac{L_m^i}{T_m^i}\right) \cdot \overline{D^p} \cdot \frac{\sum_{n=1}^{P} D_n^p \cdot \left(1 - \frac{L_m^p}{T_m^p}\right)^{n-1}}{P} \cdot L_m^p + \right.$$

$$\left. \left(1 - \frac{L_m^i}{T_m^i}\right) \cdot \left(1 - \frac{L_m^i}{T_m^i}\right)^{Pb} \cdot L_m^b \right].$$

3. A device for determining a total weighted loss rate of an MPEG-2 video stream operable to:
   determine a weighted loss rate for an I frame using a weighted value that is based on an average frame distance between the I frame and a next I frame of a video stream in the time interval;
   determine a weighted loss rate for each P frame using a weighted value, where the weighted value for each P frame is based on an average frame distance between the P frame and the next I frame of the video stream;
   determine a weighted loss rate for each B frame using a weighted value, where the weighted value is associated with a number of P frames before the B frame; and
   sum the determined weighted loss rates of the I, P and B frames to arrive at a total, weighted loss rate.

4. The device as in claim 3 wherein the total weighted loss rate ($\lambda_m$) is given by $$\lambda_m = \frac{1}{T_m} \cdot \left[ D^i \cdot L_m^i + \left(1 - \frac{L_m^i}{T_m^i}\right) \cdot \overline{D^p} \cdot \frac{\sum_{n=1}^{P} D_n^p \cdot \left(1 - \frac{L_m^p}{T_m^p}\right)^{n-1}}{P} \cdot L_m^p + \right.$$

$$\left. \left(1 - \frac{L_m^i}{T_m^i}\right) \cdot \left(1 - \frac{L_m^i}{T_m^i}\right)^{Pb} \cdot L_m^p \right].$$

5. A method for determining a total weighted loss rate of a video stream comprising:

operating a device capable of capturing network packet transmissions to determine a weighted loss rate for an I frame using a weighted value that is based on an average frame distance between the I frame and a next I frame of a video stream in the time interval;

operating the device to determine a weighted loss rate for each P frame using a weighted value, where the weighted value for each P frame is based on an average frame distance between the P frame and the next I frame of the video stream;

operating the device to determine a weighted loss rate for each B frame using a weighted value, where the weighted value is associated with a number of P frames before the B frame; and operating the device to sum the determined weighted loss rates of the I, P and B frames to arrive at a total, weighted loss rate.

6. The method as in claim 5 wherein the total weighted loss rate ($\lambda_m$) is given by $$\lambda_m = \frac{1}{T_m} \cdot \left[ D^i \cdot L_m^i + \left(1 - \frac{L_m^i}{T_m^i}\right) \cdot \overline{D^p} \cdot \frac{\sum_{n=1}^{p} D_n^p \cdot \left(1 - \frac{L_m^p}{T_m^p}\right)^{n-1}}{P} \cdot L_m^p + \left(1 - \frac{L_m^i}{T_m^i}\right) \cdot \left(1 - \frac{L_m^i}{T_m^i}\right)^{Pb} \cdot L_m^p \right].$$

* * * * *